United States Patent [19]

Kuts

[11] 3,768,101
[45] Oct. 30, 1973

[54] TRIMMING APPARATUS
[75] Inventor: Mathew Kuts, Akron, Ohio
[73] Assignee: Vulcan Corporation, Cincinnati, Ohio
[22] Filed: Feb. 18, 1972
[21] Appl. No.: 227,348

[52] U.S. Cl............ 83/408, 83/420, 83/422, 83/433, 83/441, 83/447, 83/449
[51] Int. Cl............ B23d 19/06
[58] Field of Search............ 83/372, 408, 367, 83/441, 446, 447, 449, 450, 732, 420, 421, 422, 433, 435.2, 482

[56] References Cited
UNITED STATES PATENTS

| | | |
|---|---|---|
| 1,235,006 | 7/1917 | Butler et al............ 83/441 |
| 1,111,170 | 9/1914 | Nall et al............ 83/447 X |
| 1,306,642 | 6/1919 | Stevens............ 83/368 |
| 1,985,820 | 12/1934 | Dodge et al............ 83/446 X |
| 3,151,794 | 10/1964 | Brand............ 83/368 X |

Primary Examiner—J. M. Meister
Attorney—Joseph Januszkiewicz et al.

[57] ABSTRACT

An apparatus for trimming the respective four sides of a flat elastomeric stock. The apparatus includes a pair of trim stations interconnected by a transfer conveyor wherein the respective trimming machines trim at least a pair of sides. Each of the trimming machines are adjustable automatically to compensate for variations in width as well as height of the panels of material.

8 Claims, 12 Drawing Figures

TRIMMING APPARATUS

BACKGROUND OF THE INVENTION

This invention relates generally to an apparatus for trimming panels of elastomeric material on its four sides which handles panels of elastomeric material of variant sizes with rind or flashing on the respective sides and trims the rind therefrom automatically.

In the manufacture of panels of flexible elastomeric stock it is customary to initially trim the rind or flashing off the respective sides. Such panels would weigh up to 20 pounds. To trim the flashing, numerous hand manipulations were required because the sheet stock would vary in thickness from one-sixteenth of an inch to one-half of an inch or more and due to mold shrinkage would vary in width and length. Such hand trimming is time consuming and dangerous: however, such operations were justified in light of the fact that the panels varied in dimensions including thickness, making it impractical to size and sort the panels into stacks and then provide a machine for a specific size or re-set the machine to different sizes. To cut or trim the panels to all one size wasted unnecessarily valuable material.

SUMMARY OF THE INVENTION

The present invention is directed to an apparatus which receives a panel of flat elastomeric stock having rind or flashing along the respective side edges. The flexible panel is positioned and then fed past a pair of rotating cutters, wherein one cutter and guide for such cutter is adapted to be shifted laterally to facilitate size change. Thereafter, such panel is positioned and fed past a second pair of cutters with one of such cutters and its guide means being movable to accommodate variations in size of panel.

DETAILED DESCRIPTION

Figure 3:
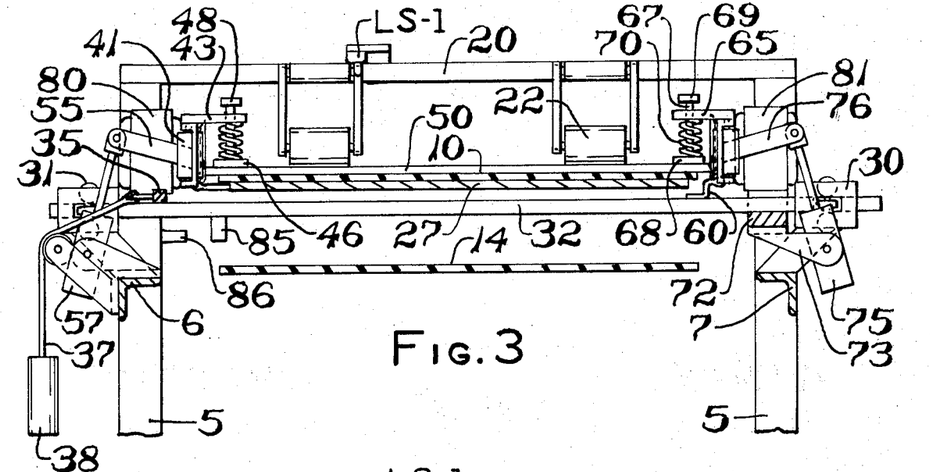
FIG. 3 is a cross-sectional view of the first trimming machine directed towards the trimming knives with the guide means in operative position.
Figure 4:
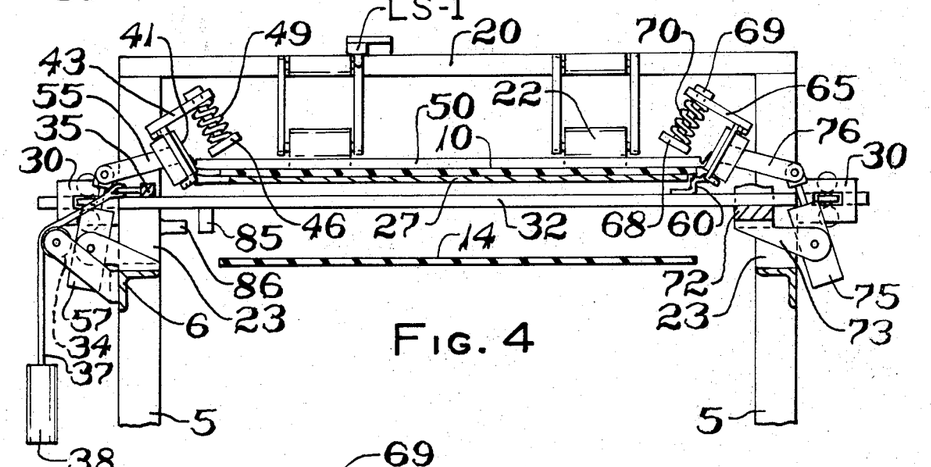
FIG. 4 is a cross-sectional view of the forward portion of the first trimming machine similar to FIG. 3 except showing the guide means in nonoperative position.
Figure 6:
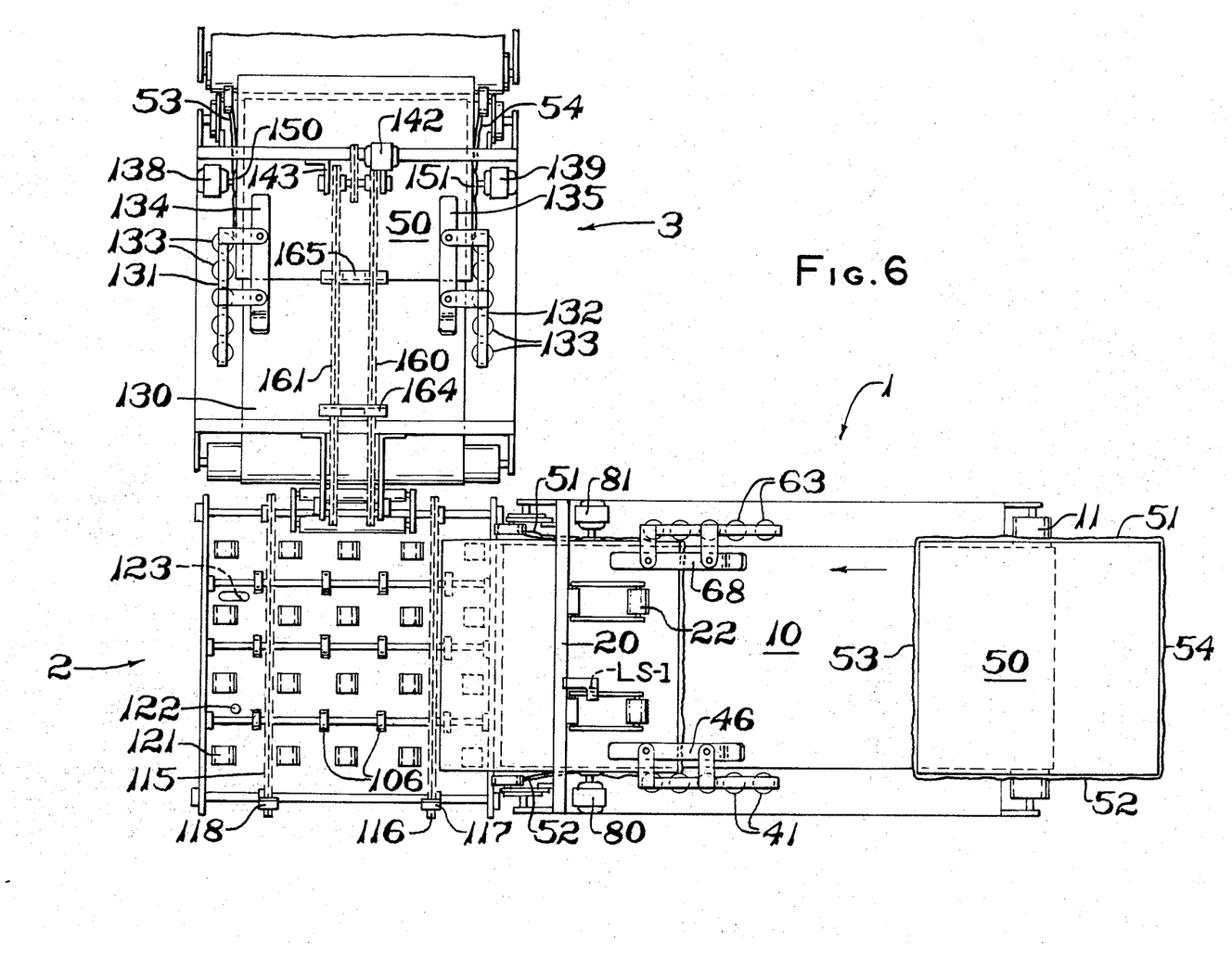
FIG. 6 is a plan view of the entire trimming apparatus.

Referring to the drawings wherein like characters refer to like parts throughout the several views there is shown in FIG. 6 a trimming apparatus having a first trimming machine 1, a transfer means 2, and a second trimming machine 3. The first trimming machine 1 has suitable framework for supporting vertically extending pairs of support legs 4 and 5 and longitudinally extending side brackets 6 and 7 (FIGS. 3 and 4). Such framework supports at the respective end portions thereof, a pair of spaced shafts 8 and 9 with rollers 11 and 12 respectively. An endless conveyor belt having a conveying run 10 and a return run 14 is trained about the respective rollers 11 and 12. A motor 15 is suitably mounted between a pair of support legs 5—5 having its output shaft connected by a pulley belt 16 to a drive shaft 9 and roller 12 which, in turn, moves the endless conveyor belt in its orbital movement about rollers 11 and 12. A cross brace 20 (FIG. 1) mounted on the one end portion of the framework pivotally supports two pairs of lever arms 21 which have their outboard ends journaling for rotation rollers 22, which rollers 22 are adapted to rollingly engage the panels of elastomeric material to be described. On the intermediate portion of the framework are mounted four vertically extending brackets 23 (FIGS. 1 and 4) which, together with brackets 24, 25, and 26, support a horizontally extending table 27 which, in turn, supports the conveying run 10 of the endless conveyor belt. Mounted on the respective brackets 23 are guide blocks 30. Each guide block is similarly constructed and only one will be described.

Guide block 30 has a pair of vertically and horizontally disposed recesses which rotatably receive rollers 31. In addition, each guide block 30 has a longitudinally extended recess which is in alignment with one rolling surface of each roller 31 such that a guide bar 32 received by a pair of transversely aligned guide blocks 30 rollingly engages the respective rollers 31 of both guide blocks, thereby accurately guiding the reciprocal movement of the guide bars 32. A pair of brackets (FIG. 1) 33 are mounted on side bracket 6 to rotatably secure a pulley 34. A laterally extending bar 35 is secured to the respective one end portions of guide bars 32 with the intermediate portion of bar 35 supporting an eye hook 36. A wire 37 trained about pulley 34 has its one end connected to a weight 38 and its other end secured to eye hook 36 thereby biasing the respective guide bars 32 in a leftward direction as viewed in FIG. 4.

Figure 1:
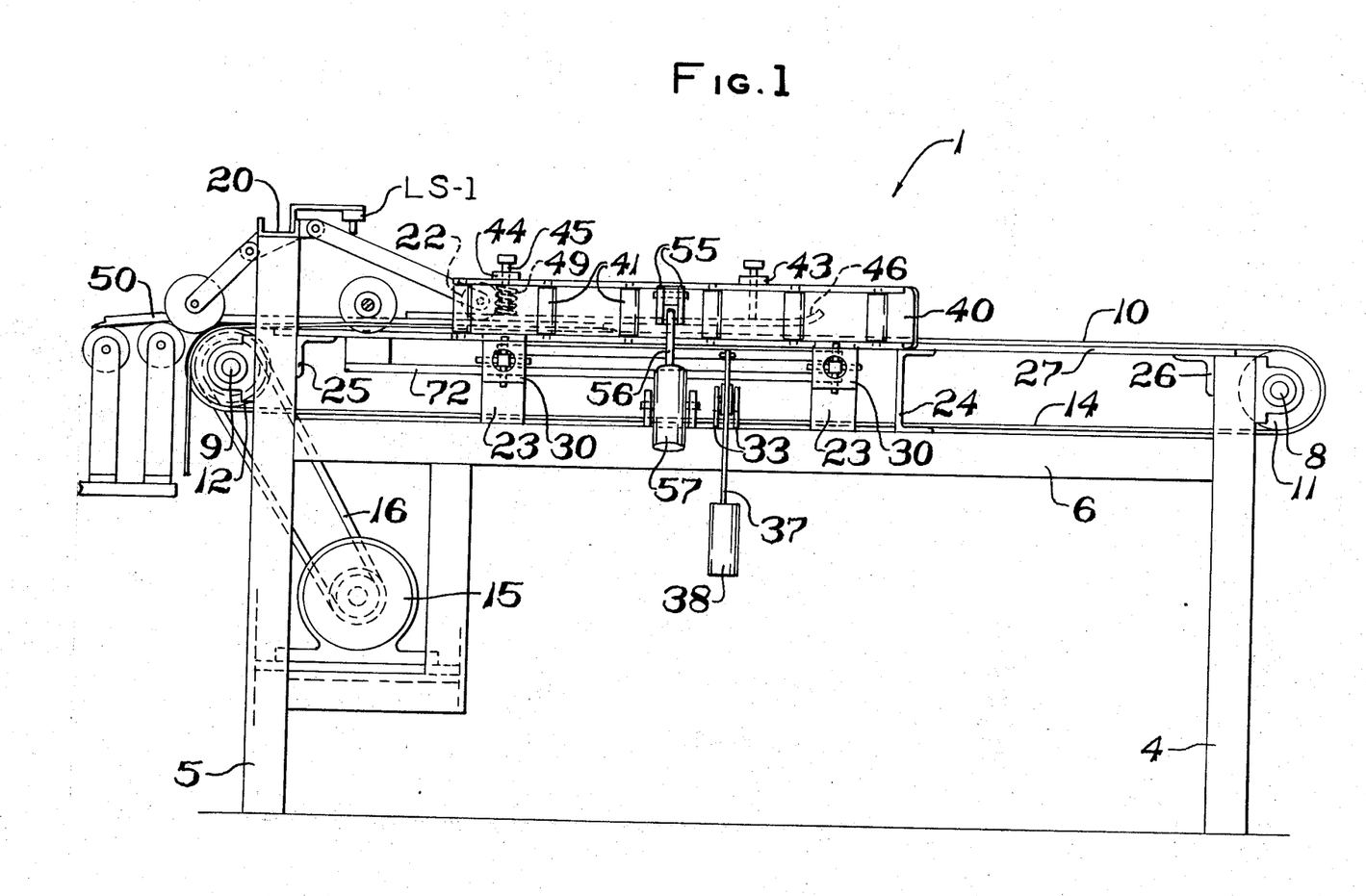
FIG. 1 is a side elevational view of the first trimming machine of the present invention.

Pivotally secured to the one end of table 27 is a guide plate member 40. Guide plate member 40 has a plurality of recesses which receive rollers 41 journaled therein which, as shown in FIG. 1, has vertically disposing axes. A pair of spaced brackets 43 and 44 (FIG. 1) are secured close to the respective end portions of guide plate member 40 and each guide plate member 40 supports for movement thereon a rod 45. The respective lower ends of each rod 45 are suitably connected to a longitudinally extended pressure plate member 46 which, as shown in FIG. 1, has an inclined portion at the forwardly most portion to facilitate the movement of the panels of elastomeric stock thereunder. The other end portion of each rod 45 has a nut 48 suitably threaded thereon. Encompassing each rod 45 between pressure plate member 46 and brackets 43 and 44 is a spring 49 which biases pressure plate member 46 downwardly for engagement with a panel member in a manner to be described.

Figure 2:
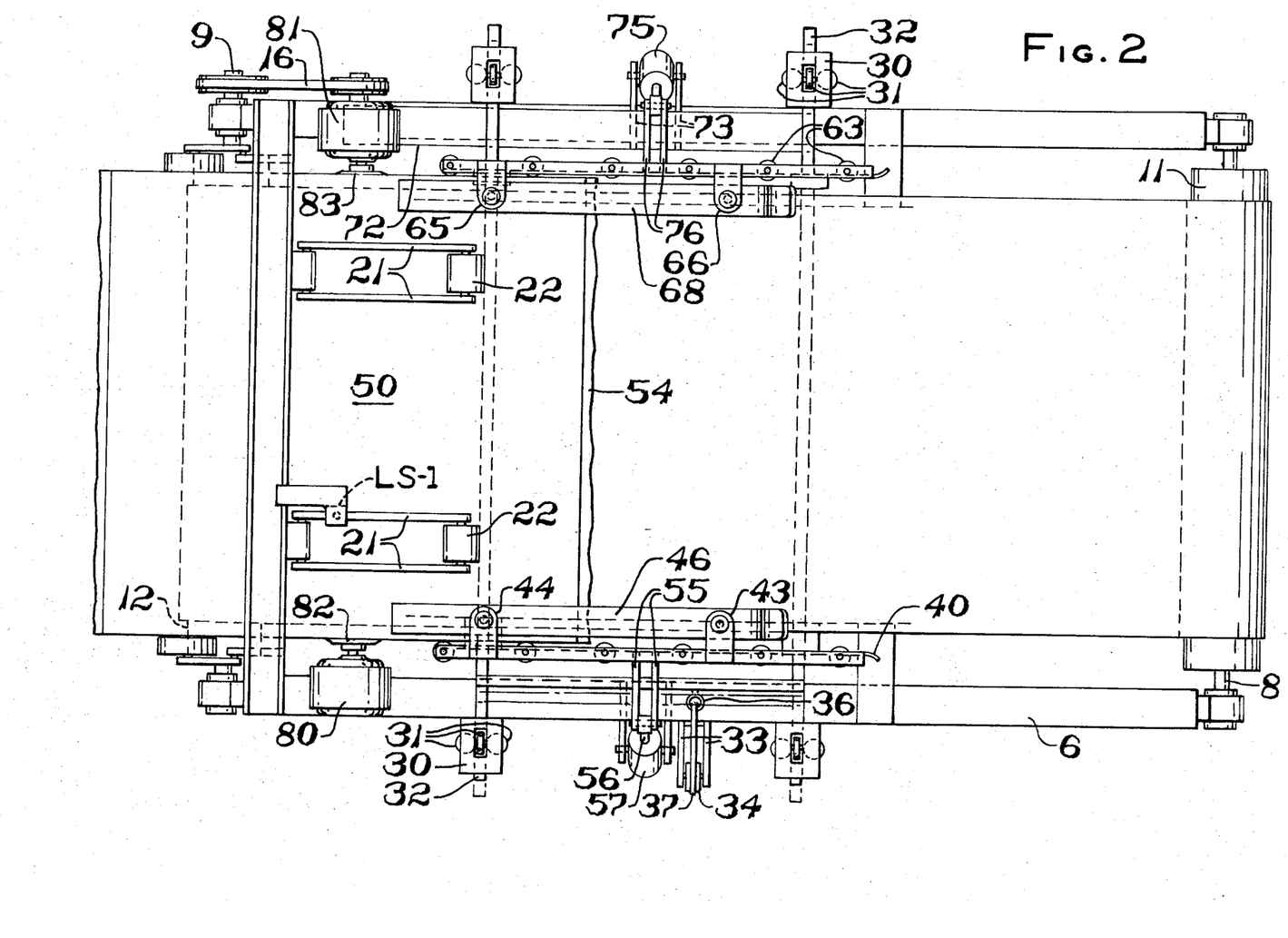
FIG. 2 is a plan view of the first trimming machine shown in FIG. 1.

A panel member 50 as shown in FIG. 6 is substantially square in plan view having rind or flashing 51, 52, on the respective side portions and rind or flashing 53, 54 on the respective end portions. As seen in FIG. 3, the panel 50 is held in position by the pressure plate members 46 whereas in FIG. 44 such panel 50 is in a position to be engaged by the pressure plate members and centered thereby in a manner to be described. The guide plate member 40 has its intermediate portion suitably connected to a pair of lever members 55 (FIGS. 3 and 1) which, in turn, are pivotally connected to the piston rod 56 of a pneumatic cylinder 57. Pneumatic cylinder 57 is journaled for pivotal movement on the framework by a pair of brackets which, as shown in plan view in FIG. 2, facilitate the pivotal movement of the guide plate 40 along with the pressure plate member 46.

The other end portions of guide bars 32 are secured together by a longitudinally extending bracket member 60 (FIGS. 3 and 4) which pivotally supports guide plate member 61 similar in all respects to the previously described guide plate member 40. Guide plate member 61 has a plurality of recesses which journal for rotation rollers 63 whose forwardly most disposed portion is tangent to each other to facilitate the movement of a panel of elastomeric material therethrough. Guide plate member 61 has secured to the upper most end portion a pair of space end brackets 65, 66 (FIG. 2) which journal for vertical movement a pair of guide rods 67 whose respective end portions are secured to a guide plate 68 and whose upper end receives a threaded nut 69. Encompassing the respective rods 67 are springs 70 having one end portion in abutting engagement with the pressure plate 68 and whose upper end is in abutting contact with the brackets 65 and 66, respectively. Mounted closely adjacent to longitudinally extending bracket member 60, on the underside of bars 32, is a longitudinally extending plate member 72 to which is secured a pair of brackets 73 (FIG. 2) which pivotally support cylinder 75. Cylinder 75 has its piston rod suitably connected to a pair of lever members 76 which, in turn, are secured to guide plate member 61 to facilitate the pivotal movement of the guide plate member 61 along with the pressure plate 68.

In the trimming machine 1, there are two guide blocks 30 on the one side and two guide blocks 30 on the other side. Additional blocks 30 for other guide bars 32 may be provided to facilitate the guiding of the guide plate member 61 along with plate member 72.

Mounted on a forwardly disposed portion of the first trimming machine 1 on suitable brackets are motors 80 and 81 (FIG. 2) having their output end suitably connected to rotary cutters 82 and 83 which are adapted to trim the rind from the respective side portions of the panels 50. Motor 81 and cutter 83 are mounted on plate member 72 for movement laterally with the guide bars 32 in response to the biasing action of weight 38. To limit the leftward movement of plate member 72 and the guide bar 32, projections 85 on the guide bars 32 are operative to engage adjustable stops 86 in support legs 5. The guide plate members 40, 61 and pressure plate members 46 and 68 cooperate to act as guide means for the positioning of a panel as it moves past the cutters 82 and 83.

Transfer apparatus 2 has suitable framework including upwardly extending legs 90 and a horizontally extending table 91. The respective legs 90 are interconnected by braces and supports 92-92, which supports 92-92 have a plurality of bushings 93 which guide rods 94 in their reciprocal movement therethrough. The one end of the respective rods 94 are connected to a plate member 95 which supports a motor 96. The other end portions of rods 94 are connected to horizontally disposed plate members 97. Another plate member 38 extends in the same direction as plate members 97 having secured to it the piston rod of a pneumatic cylinder 100. The energization of the head end of cylinder 100 moves plate member 98 upwardly whereas pressurization of the rod end of cylinder 100 moves the plate member 98 downwardly along with supporting rollers in a manner to be described.

Figure 7:
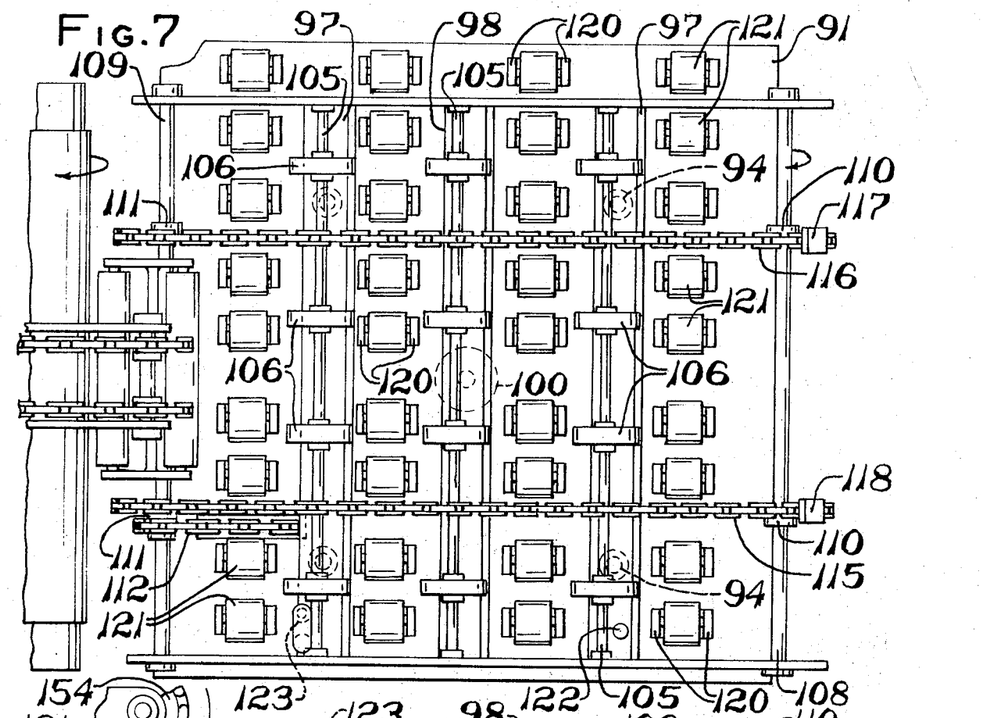
FIG. 7 is a plan view of the transfer means between the first and second trimming machines of the trimming apparatus.
Figure 8:
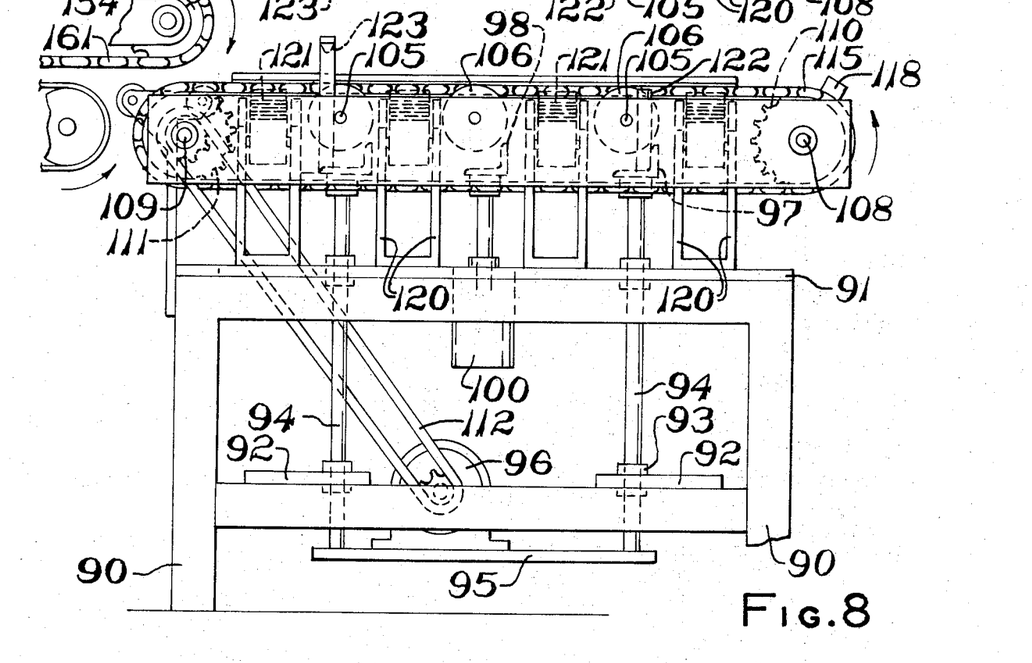
FIG. 8 is an end elevational view of the transfer apparatus.

The respective end portions of plate members 97—97 and plate member 98 are connected to spaced brackets 102 and 103 (FIG. 7) to facilitate their simultaneous reciprocation in accordance with the energization of cylinder 100. Extending laterally between brackets 102 and 103 are plurality of shafts 105 which have journaled for rotation thereon a plurality of rollers 106. The respective end portions of brackets 102 and 103 support shafts 108 and 109, respectively, which shafts, in turn, have keyed thereto pairs of sprockets 110 and 111, respectively. Shaft 109 is driven by a chain 112 connected to the output end of motor 96. Chains 115 and 116 are trained about sprockets 110 and 111, respectively, such that upon energization of motor 96, chains 115 and 116 will orbit as sprockets 110 and 111 rotate. Suitably connected to chains 115 and 116 are a pair of cleats 117 and 118 to facilitate the movement of panels 50 in a manner to be described.

Figure 10:
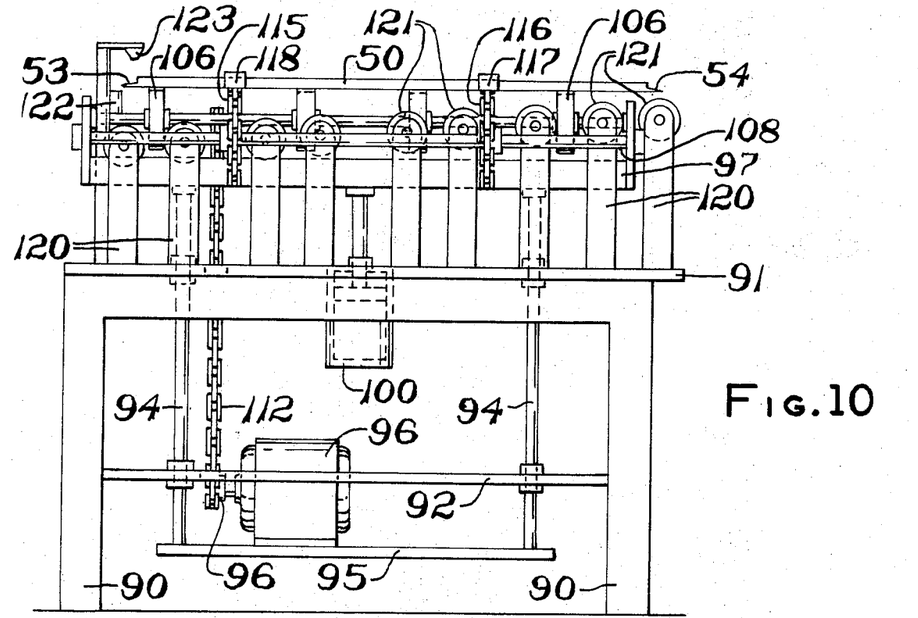
FIG. 10 is a side elevational view of the transfer apparatus showing one set of rollers in the conveying position.

Table 91 supports a plurality of vertically extending pairs of brackets 120. Each pair of brackets 120 supports rollers 121 (FIG. 10). The respective pairs of brackets 120 are shorter as one moves further away from trimming machine No. 1. This action facilitates the removal of a panel of elastomeric material away from trimming machine 1. The axes of rollers 121 are at right angle to rollers 106.

Figure 9:
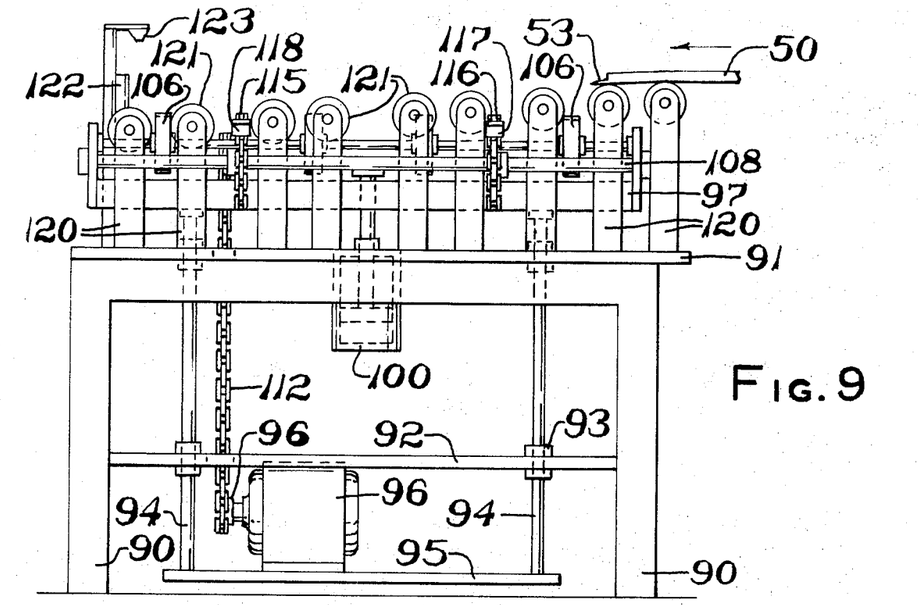
FIG. 9 is a side elevational view of the transfer apparatus in the receiving position.

FIG. 9 discloses a panel 50 entering the transfer apparatus while FIG. 10 discloses such panel in a raised position wherein the panel is out of contact with the respective rollers 121. A pair of stops 122 are located at one end of the transfer means 2 as disclosed in plan view of FIG. 6 with an electric eye 123 located adjacent thereto, which electric eye operates the energization of the valve that controls the energization of pneumatic cylinder 100 as well as a time delayed switch which energizes motor 96. These items are conventional in the art and, accordingly, will not be described.

Figure 11:
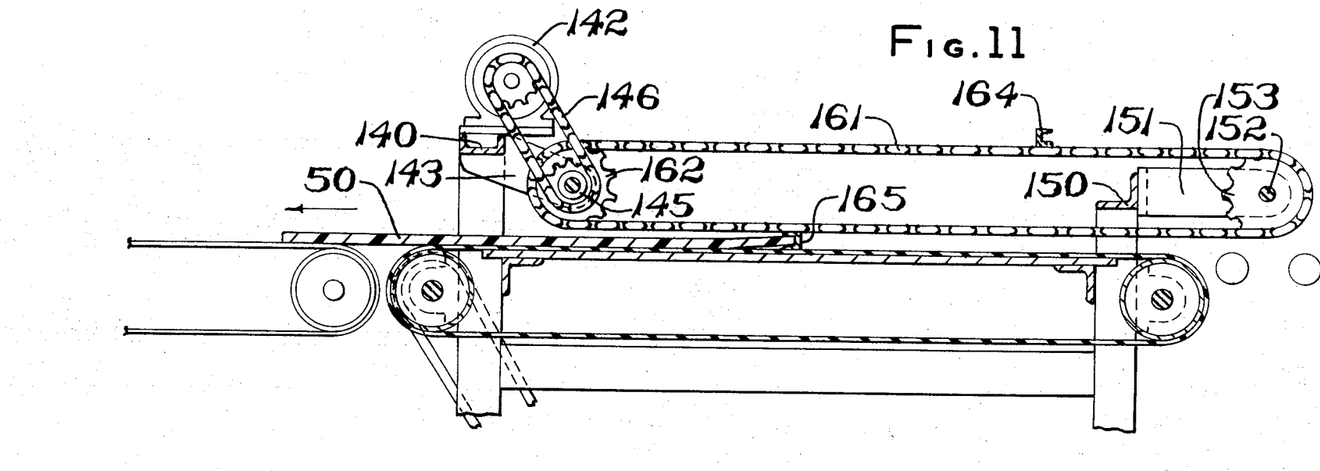
FIG. 11 is a cross-sectional view of the second trimming machine.
Figure 12:
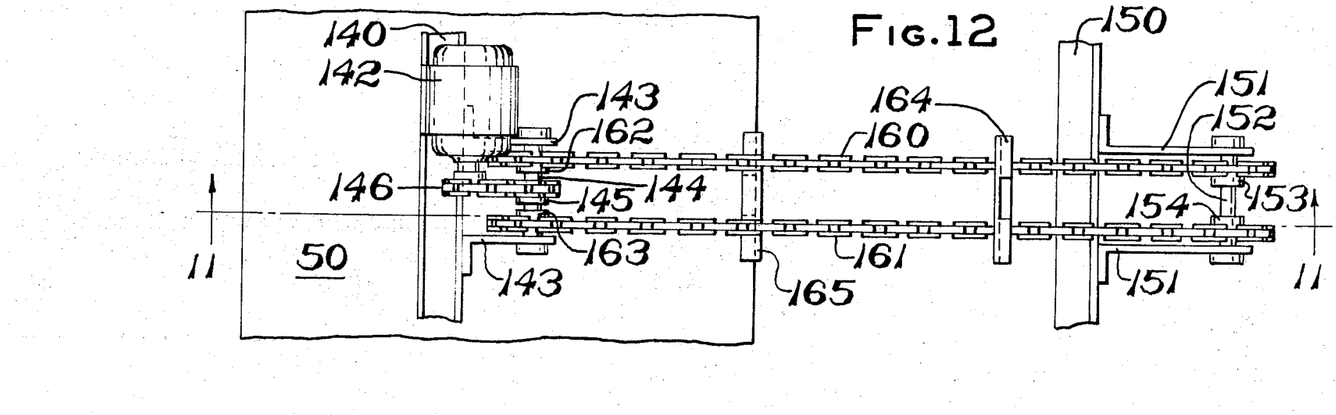
FIG. 12 is a plan view of the central portion of the second trimming machine showing the conveying means.

Trimming machine 3 (FIG. 6) is similar to trimming machine 1 having an endless conveyor belt 130 with spaced guide plate members 131 and 132 supporting rollers 133 similar to the guide plate members 40 and 61 in trimming machine 1. Guide plate members 131 and 132 support pressure plate members 134 and 135. Guide plate member 131 along with pressure plate member 134 is stationary as in the first embodiment while guide plate member 132 along with pressure plate member 135 is movable by cylinder means similar to cylinder 75 of trimming machine 1 shown in FIG. 4. Trimming machine 3 has a pair of laterally spaced motors 138 and 139 supporting rotary knives that remove the rind or flashing 53 and 54 from the respective ends of panel 50. Motor 139, along with pressure plate 135, is movable laterally in the same manner as motor 81 and pressure plate 68. The only difference between trimming machine 3 with that of trimming machine 1 is that trimming machine 3 has a different type of conveying means for moving the panels of elastomeric materials therethrough. Such conveying means for trimming machine 3 includes laterally extending brackets 140 (FIGS. 6, 11, and 12) at one end of the machine which supports a motor 142. Brackets 140 support a pair of outwardly extending brackets 143 which journal for rotation a shaft 144. A sprocket 145 is keyed to shaft 144, which sprocket 145 is connected to the output shaft of motor 142 by a chain 146. At the other end portion of trimming machine 3 adjacent to transfer means 2 is a laterally extending bracket 150 which supports a pair of brackets 151 which journals for rotation a shaft 152. Shaft 152 has a pair of sprockets 153 and 154 suitably keyed thereto. A chain 160 is trained about sprocket 153 and a sprocket 162 keyed to shaft 144 while a chain 161 is trained about sprocket 154 and a sprocket 163 which keyed to shaft 144 such that energization of motor 142 will orbit the chains 160 and 161. Chains 160 and 161 are interconnected by laterally extending brackets 164 and 165. Such brackets 164 and 165 (FIG. 11) are L-shaped in cross section, having one of their leg members tapered to a leading edge to facilitate the pick up of one end of a panel 50 for moving such panel through the trimming machine 3.

In the operation of the apparatus described, an operator places a panel of elastomeric material onto the conveying run 10 of trimming machine 1 which conveys the panel of material in a leftward direction as viewed in FIG. 1 until the panel material passes underneath rollers 22 which, in their movement, raises lever arms 21 which actuate a limit switch LS-1 as indicated diagrammatically in FIG. 1, which, in turn, actuates cylinders 57 and 75. Cylinder 57 is actuated prior to that of cylinder 75 such that guide plate member 40 is pivoted into a vertical position which tends to push the panel 50 in an upward direction as viewed in FIG. 6 (plan view) which is toward the top of the page. However, on energization of cylinder 75, guide plate member 61 is pivoted into a vertical position along with a biasing action of weight 38 acting through rod members 32 to center the panel member in a longitudinally extending direction along the path of movement of panel 50 while being conveyed by the conveying run 10. Such action moves the pressure plate members 46 and 68 downwardly into contact with the upper surfaces of the panel 50 to maintain such elastomeric panel in a horizontally extending flat condition in preparation for the trimming operation. The biasing action of the weight 38 will cause the guide plate member 61 along with cutter 83 to adjust for the width of panel 50 and assures that only the rind is trimmed, thereby reducing the scrap material. Simultaneously with such action, motors 80 and 81 are energized by LS-1 such that their respective rotary cutters 82 and 83 trim the rind 52 and 51 from the panel 50 as such panel is conveyed past the cutters by the movement of the conveying run 10 of the endless conveyor.

The movement of the panel to the transfer means 2 is facilitated by the respective rollers 121 descending in height, and as the panel 50 is conveyed onto the transfer means 2, the panel actuates the electric eye 123 which thereby pressurizes the head end of pneumatic cylinder 100 which raises the respective bracket 97 and bracket 98. Stops 122 assure that stopping of the panel in its movement onto the transfer means 2. As the respective rollers 106 move upwardly upon actuation of cylinder 100, the panel 50 is moved upward above the rollers 121 and is conditioned for conveying to the trimming machine 3. After a predetermined time interval after actuation of electric eye 123, motor 96 is energized which begins the orbiting of chains 115 and 116. The pair of cleats 117 and 118 on chains 116 and 115 engage the end portion of the panel 50 and convey such panel onto the endless conveyor 130 of trimming machine 3. After a predetermined time interval of actuation of motor 96, motor 142 is energized which begins the orbiting of chains 160 and 161 such that the laterally extending brackets 164 or 165 engage the end portion of panel 50 and convey such panel toward the cutters 150 and 151 of motors 138 and 139, respectively, of trimming machine 3. The panel 50 on conveyor 130 is positioned in the same manner as on conveying run 10 of trimming machine 1 wherein the respective pressure plates 134, 135, along with guide plate members 131 and 132, position the panel with guide plate members 131 being stationary and guide plate member 132 moving laterally to adjust for the width of the panel. In addition, motor 139 adjusts along with the plate member 132 as motor 81 and cutter 83 in trimming machine 1. The panel is trimmed by cutter 83 as it is discharged by trimming machine 3.

Figure 5:
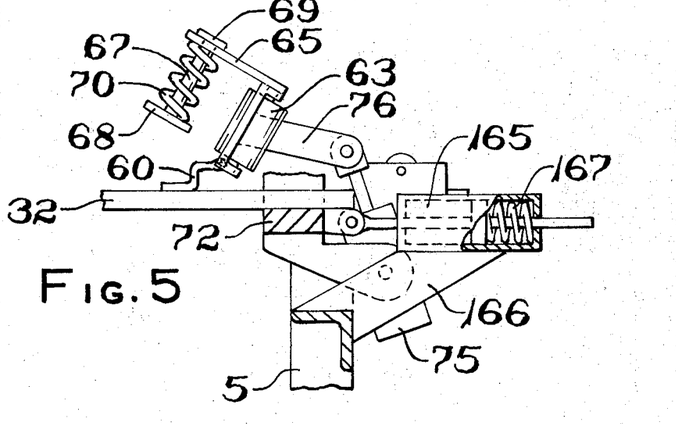
FIG. 5 is a fragmentary cross-sectional view of a modified form of the apparatus shown in FIG. 4.

A modification of the described apparatus is shown in FIG. 5 wherein the weight 38 is replaced by a spring biased pneumatic cylinder 165 which is secured by bracket 166 to the supporting structure of the apparatus. The piston rod of cylinder 165 is secured to the plate member 72 which in turn is secured to the guide bars 32. A spring 167 is mounted in the head end of cylinder 165 such that it biases the guide bar 32 leftwardly as shown in FIG. 5. Pressurization of the rod end of cylinder 165 moves the bars 32 along with the guide plate member 61 and the pressure plate 68 rightwardly as viewed in FIG. 5 to assure greater flexibility in handling different widths of stock. The overall operation is the same as that described above.

Although specific embodiments and a preferred mode of operation of the invention have been hereinbefore described, it is understood that the subject invention is not limited thereto since variations and modifications thereof can be made without departing from the principles of the invention.

I claim:

1. An apparatus for processing panels of elastomeric material comprising support means, conveyor means with a longitudinal center line mounted on said support means for conveying said panels, a first guide means pivotally mounted on one side of said support means, a support member slidably mounted on the other side of said support means for movement toward and away from said longitudinal center line, biasing means operatively connected to said support member for biasing said support member toward said longitudinal center line a pair of cutters at one end of said conveyor means for trimming the respective side edges of a panel passing thereby, one of said cutters mounted on said support member for movement therewith, the other of said cutters mounted on said support means in alignment with said first guide member, a second guide means pivotally mounted on said support member and for movement therewith, and power operated means connected to said guide means respectively for pivoting said guide means between an inoperative position and an operative position for guiding contact with a panel being conveyed by said conveyor means.

2. An apparatus for processing panels as set forth in claim 1 wherein each of said guide means includes a longitudinally extending guide plate member with recesses therein, each of said recesses having a roller therein, the axes of said rollers being vertical in the operative position of said guide members, a plane tangent to the respective rollers being respectively in alignment with said cutters, and each of said guide members having a resiliently mounted pressure plate biased downward toward said conveyor means and being normal to said supporting longitudinal guide plate member.

3. An apparatus for processing panels as set forth in claim 1 wherein pneumatic cylinder means are connected to said biasing means, said pneumatic cylinder means operative upon energization to act against said biasing means and move said one guide means away from said center line.

4. Apparatus for processing panels of sheet material comprising support means, conveyor means for moving panels thereon, said conveyor means having a longitudinal pass line, a pair of laterally spaced cutters at one end of said conveyor means for trimming opposed side edges of a panel passing therebetween, a pair of guide means mounted on said support means on opposite sides of the conveyor means for centering said panel on said conveyor means while passing said cutters, each of said guide means having a resiliently mounted pressure plate movable therewith to adjust for thickness of panels upon movement of said resiliently mounted plates into a horizontally disposed position, one of said guide means movable laterally towards and away from said longitudinal center line, means interconnecting said one guide means and one of said cutters for simultaneous movement, the other said guide means and cutter having a fixed mounting with respect to the longitudinal center line, biasing means connected to said one guide means and said one cutter for biasing said one guide means and said one cutter toward said longitudinal center line to adjust the distance between said cutters in response to the width of a panel received by said conveyor means and said guide means, and power operated means connected to the guide means for pivoting said guide means into operative and inoperative positions, respectively.

5. An apparatus for processing panels as set forth in claim 4 wherein each of said guide means has a plurality of rollers having their axes of rotation parallel and in alignment with a plane tangent to their innermost surfaces, and wherein said tangent plane passes through one of said cutters.

6. An apparatus for processing panels as set forth in claim 5 wherein the power operated means for moving said one guide means and said one cutter away from said center line has a delayed action with respect to the power operated means for said other guide means.

7. An apparatus for processing panels of elastomeric materials comprising a pair of rind trimming machines, a transfer means operative to convey panels from one of said machines to the other of said machines, each machine having conveyor means with a longitudinal center line, the extension of said longitudinal center lines intersect and lie at right angles to each other, each of said trimming machines having a pair of spaced cutters mounted on opposite sides of said longitudinal center line for trimming the respective edges of a panel material passing therethrough and which edges of the panels being trimmed of rind are parallel to the longitudinal center line of said conveyor means conveying said panels, each of said trimming machines having a pair of spaced guide means for cooperation with the conveyor means for guiding panels past said cutters, each of said guide means having a guide plate member pivotable about an axis parallel to said longitudinal center line, each of said guide plate members receiving a plurality of rollers, each of said guide plate members having a resiliently held pressure plate for pivotal movement therewith, and each of said pressure plates in the operative position of said guide means lying in a horizontally disposed plane for accomodating different thicknesses of panels, each of said trimming machines having one of its said guide means and one of said cutter means moveable laterally towards and away from said longitudinal center line to accomodate varying widths of panels, means biasing said one moveable guide means and said one cutter means toward the longitudinal center line adjacent thereto, and power operated means connected to said guide means for moving said guide means into and out of operative position.

8. An apparatus for processing panels as set forth in claim 7 wherein said power operated means includes pneumatic cylinder means connected to said guide plate members for pivoting said guide plate members and said pressure plates into and out of operative positions.

* * * * *